US012407092B2

(12) United States Patent
Barrera et al.

(10) Patent No.: US 12,407,092 B2
(45) Date of Patent: Sep. 2, 2025

(54) ELECTRONIC DEVICE HAVING ANTENNAS IN VENTILATION DUCTS

(71) Applicant: Apple Inc., Cupertino, CA (US)

(72) Inventors: Joel D. Barrera, Cedar Park, TX (US); Jerzy S. Guterman, Sunnyvale, CA (US); Michael J. Williams, Saratoga, CA (US); Daniel D. Hershey, San Francisco, CA (US); Zachary S. Chase, Portola Valley, CA (US); Xuyao Shi, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 814 days.

(21) Appl. No.: 17/573,524

(22) Filed: Jan. 11, 2022

(65) Prior Publication Data

US 2023/0223681 A1 Jul. 13, 2023

(51) Int. Cl.

*H01Q 1/44* (2006.01)
*H01Q 13/10* (2006.01)
*H01Q 1/22* (2006.01)

(52) U.S. Cl.

CPC ............... *H01Q 1/44* (2013.01); *H01Q 13/10* (2013.01); *H01Q 1/2266* (2013.01)

(58) Field of Classification Search

CPC ........ H01Q 1/44; H01Q 13/10; H01Q 1/2266; H01Q 1/2291

See application file for complete search history.

(56) References Cited

U.S. PATENT DOCUMENTS

| | | | | |
|---|---|---|---|---|
| 8,228,239 | B2 | 7/2012 | Lagnado et al. | |
| 8,264,412 | B2 * | 9/2012 | Ayala | H01Q 9/42 343/702 |
| 9,450,289 | B2 | 9/2016 | Guterman et al. | |
| 9,653,777 | B2 | 5/2017 | Guterman et al. | |
| 9,800,965 | B2 | 10/2017 | Miehl et al. | |
| 10,268,236 | B2 | 4/2019 | Guterman et al. | |
| 10,476,131 | B2 * | 11/2019 | Chang | H01Q 13/106 |
| 10,566,678 | B2 * | 2/2020 | Wu | H01Q 7/00 |
| 10,591,960 | B2 | 3/2020 | Tani et al. | |
| 10,608,321 | B2 | 3/2020 | Jiang et al. | |

(Continued)

FOREIGN PATENT DOCUMENTS

EP 2568530 B1 11/2020

*Primary Examiner* — Seung H Lee

(74) *Attorney, Agent, or Firm* — Treyz Law Group, P.C.; Michael H. Lyons

(57) ABSTRACT

An electronic device may have an upper housing and a lower housing separated by a slow. A substrate may be mounted in the lower housing and may have an inner surface facing an interior of the lower housing and an outer surface facing the slot. Ventilation port openings may extend from the outer surface to the inner surface. Ribs in the substrate may separate the ventilation port openings. The ribs may include notches at the inner surface. An antenna may include conductive traces within multiple ventilation port openings and extending through the notches. The conductive traces may be offset from the outer surface. The outer surface of the substrate may be free from conductive material from the antenna. This may serve to maximize antenna efficiency while protecting the antenna from external forces and debris or other contaminants that pass through the slot during use of the electronic device over time.

20 Claims, 12 Drawing Sheets

(56) References Cited

U.S. PATENT DOCUMENTS

| | | | | |
|---|---|---|---|---|
| 10,727,590 | B2 | 7/2020 | Barrera et al. | |
| 10,978,806 | B2 | 4/2021 | Garrido Lopez et al. | |
| 11,132,030 | B2 * | 9/2021 | Huang | E05D 3/02 |

* cited by examiner

ELECTRONIC DEVICE HAVING ANTENNAS IN VENTILATION DUCTS

BACKGROUND

This relates generally to electronic devices and, more particularly, to wireless electronic devices with antennas.

Electronic devices often include antennas. For example, cellular telephones, computers, and other devices often contain antennas for supporting wireless communications.

It can be challenging to form electronic device antenna structures with desired attributes. In some wireless devices, the presence of conductive housing structures can influence antenna performance. Device size can also affect performance. It can be difficult to achieve desired performance levels in a compact device, particularly when the compact device has conductive housing structures. In addition, antenna structures can be susceptible to damage or contaminants that detrimentally impact performance.

It would therefore be desirable to be able to provide improved wireless circuitry for electronic devices.

SUMMARY

An electronic device may have a metal housing. The metal housing may have an upper housing in which a component such as a display is mounted and a lower housing in which a component such as a keyboard is mounted. Hinges may be used to mount the upper housing to the lower housing for rotation about a rotational axis.

A substrate may be mounted in the lower housing between upper and lower conductive housing walls. The substrate may have an inner surface that faces an interior of the lower housing. The substrate may have an outer surface that faces a slot between the upper and lower housings. The substrate may include ventilation port openings that extend from the outer surface to the inner surface. The substrate may include ribs that separate the ventilation port openings. Notches may be formed in the ribs at the inner surface.

An antenna may be disposed on the substrate for radiating through the slot. The antenna may include conductive traces within multiple ventilation port openings. The conductive traces may pass through the notches in the ribs at the inner surface of the substrate. The conductive traces may be offset from the outer surface of the substrate. The outer surface of the substrate may be free from conductive material in the antenna. This may serve to maximize antenna efficiency while protecting the antenna from external forces and debris or other contaminants that pass through the slot during use of the electronic device over time.

DETAILED DESCRIPTION

Figure 1:
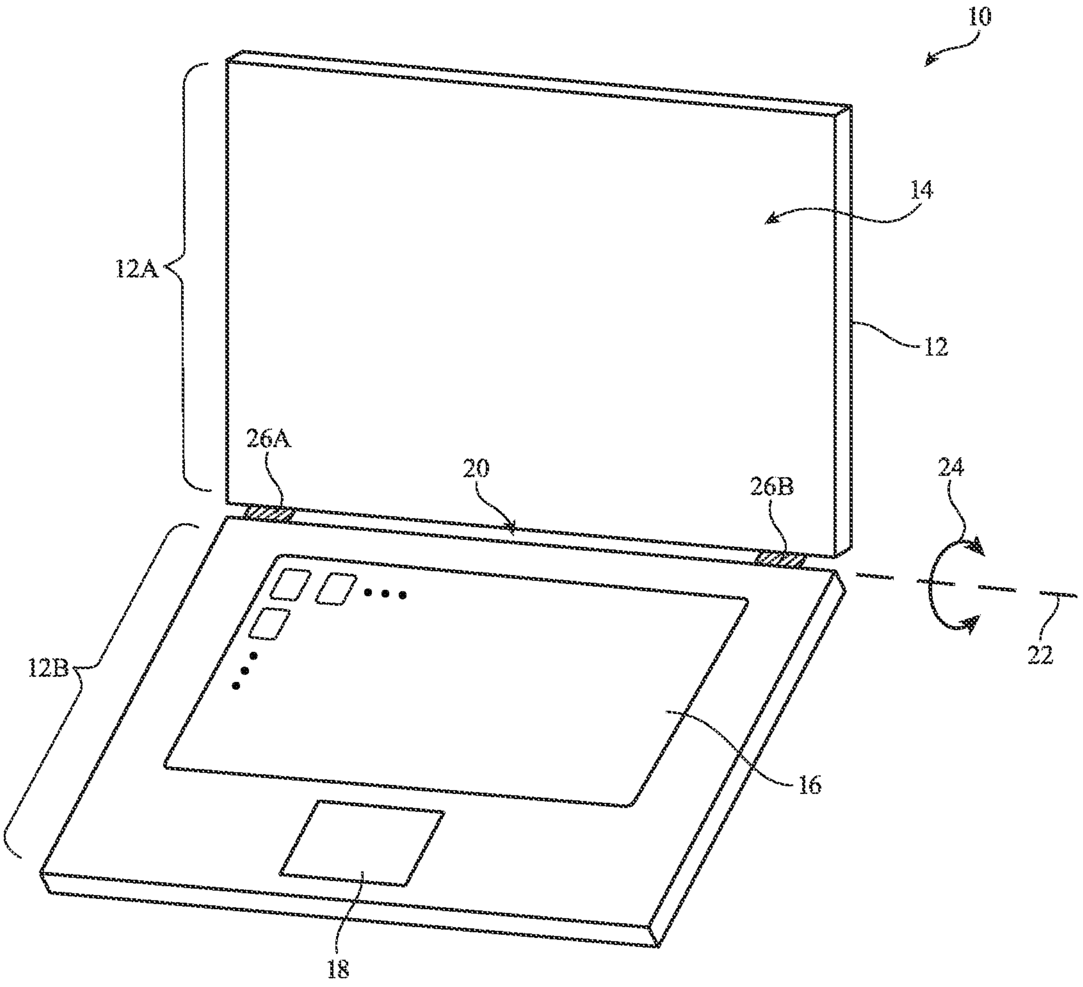
FIG. 1 is a perspective view of an illustrative electronic device such as a laptop computer in accordance with some embodiments.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHz Bluetooth® or other wireless personal area network (WPAN) bands and the 2.4 GHz and 5 GHz Wi-Fi® band or other wireless local area network (WLAN) bands (sometimes referred to as IEEE 802.11 bands or wireless local area network communications bands). Device 10 may also contain wireless communications circuitry for performing near-field communications, communications at millimeter/centimeter wave frequencies, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, wireless base station, wireless access point, home entertainment console, portable speaker, gaming accessory, wristwatch device, head-mounted display device, or other wearable device, or may be other electronic equipment. Configurations in which device 10 has a rotatable lid as in a portable (e.g., laptop) computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Some of the structures in housing 12 may be conductive. For example, metal parts of housing 12 such as metal housing walls may be conductive. Other parts of housing 12 may be formed from dielectric material such as plastic, glass, ceramic, non-conducting composites, etc. To ensure that antenna structures in device 10 function properly, care should be taken when placing the antenna structures relative to the conductive portions of housing 12.

If desired, portions of housing 12 may form part of the antenna structures for device 10. For example, conductive housing sidewalls may form all or part of an antenna ground. The antenna ground may include planar portions and/or portions that form one or more cavities for cavity-backed antennas. In addition to portions of housing 12, the cavities in the cavity-backed antennas may be formed from metal brackets, sheet metal members, and other internal metal structures, and/or metal traces on dielectric structures (e.g., plastic structures) in device 10. Metal traces may be formed on dielectric structures using molded interconnect device techniques (e.g., techniques for selectively plating metal traces onto regions of a plastic part that contains multiple shots of plastic with different affinities for metal), using laser direct structuring techniques (e.g., techniques in which laser light exposure is used to activate selective portions of a plastic structure for subsequent electroplating metal deposition operations), or using other metal trace deposition and patterning techniques.

As shown in FIG. 1, device 10 may have input-output devices such as track pad 18 (e.g., a touch pad, mouse, other touch-based user input device) and keyboard 16 (e.g., having a set of mechanical and/or electronic-based keys and/or a touch screen display). Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (e.g., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and a lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the upper edge of lower housing 12B and the lower edge of upper housing 12A. For example, housings 12A and 12B may be coupled by hinges 26 such as hinges 26A and 26B that are located at opposing left and right sides of housing 12 along a rotational axis such as axis 22 (sometimes referred to herein as hinge axis 22). A slot-shaped opening such as opening 20 may be formed between upper housing 12A and lower housing 12B and may be bordered on either end by hinges 26A and 26B. Opening 20 may sometimes be referred to herein as gap 20 or slot 20 between upper housing 12A and lower housing 12B. Hinges 26A and 26B, which may be formed from conductive structures such as metal structures, may allow upper housing 12A to rotate about axis 22 in directions 24 relative to lower housing 12B. Slot 20 extends along the rear edge of lower housing 12B parallel to axis 22. The lateral plane of upper housing (lid) 12A and the lateral plane of lower housing 12B may be separated by an angle that varies between 0° when the lid is closed to 90°, 140°, 160°, or more when the lid is fully opened.

Figure 2:
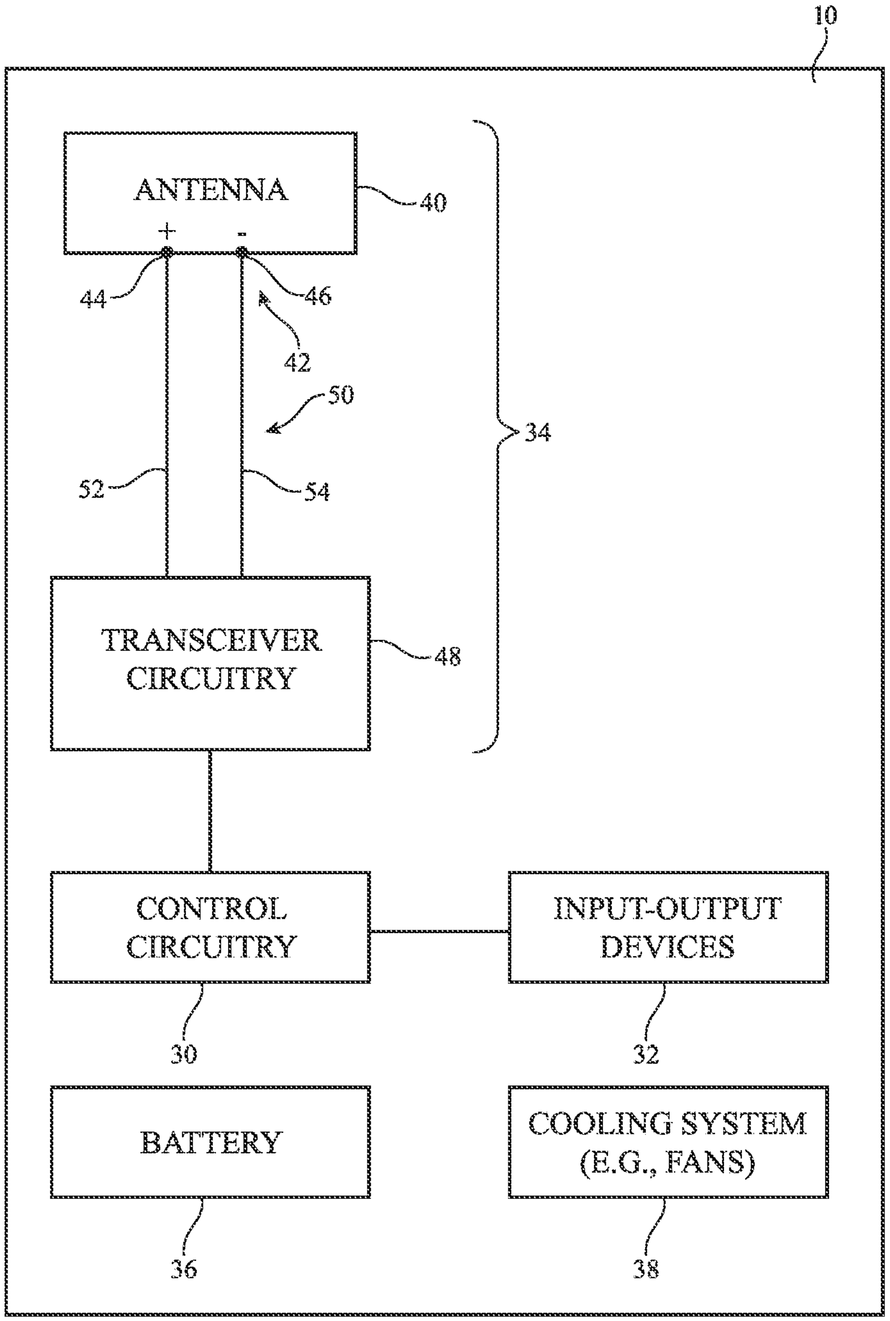
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry such as control circuitry 30. Control circuitry 30 may include storage and/or processing circuitry. Storage in control circuitry 30 may include hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 30 may be used to control the operation of device 10. This processing circuitry may include one or more microprocessors, microcontrollers, digital signal processors, host processors, baseband processor integrated circuits, application specific integrated circuits, central processing units (CPUs), graphics processing units (GPUs), etc. Control circuitry 30 may be configured to perform operations in device 10 using hardware (e.g., dedicated hardware or circuitry), firmware, and/or software. Software code for performing operations in device 10 may be stored on control circuitry 30 (e.g., storage in control circuitry 30 may include non-transitory (tangible) computer readable storage media that stores the software code). The software code may sometimes be referred to as program instructions, software, data, instructions, or code. Software code stored on the storage may be executed by processing circuitry in control circuitry 30.

Control circuitry 30 may be used to run software on device 10 such as internet browsing applications, voice-over-internet-protocol (VOIP) telephone call applications, email applications, media playback applications, operating system functions, etc. To support interactions with external equipment, control circuitry 30 may be used in implementing communications protocols. Communications protocols that may be implemented using control circuitry 30 include internet protocols, wireless local area network protocols (e.g., IEEE 802.11 protocols-sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers, proximity sensors, and other sensors and input-output components.

Device 10 may include wireless communications circuitry 34 that allows control circuitry 30 of device 10 to communicate wirelessly with external equipment. The external equipment with which device 10 communicates wirelessly may be a computer, a cellular telephone, a watch, a router, access point, or other wireless local area network equipment, a wireless base station in a cellular telephone network, a display, a head-mounted device, or other electronic equipment. Wireless communications circuitry 34 may include radio-frequency (RF) transceiver circuitry 48 and one or more antennas such as antenna 40. Configurations in which device 10 contains a single antenna may sometimes be described herein as an example. In general, device 10 may include any number of antennas.

Transceiver circuitry 48 may support communications in Extremely High Frequency (EHF) or millimeter wave communications bands between about 30 GHz and 300 GHz, in centimeter wave communications bands between about 10 GHz and 30 GHz (sometimes referred to as Super High Frequency (SHF) bands), wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Transceiver circuitry 48 may include one or more integrated circuits, power amplifier circuitry, low-noise input amplifiers, passive radio-frequency components, switching circuitry, transmission line structures, and other circuitry for handling radio-frequency signals.

If desired, device 10 may be supplied with a battery such as battery 36. Control circuitry 30, input-output devices 32, wireless communications circuitry 34, and power management circuitry associated with battery 36 may produce heat during operation. To ensure that these components are cooled satisfactorily, device 10 may be provided with a cooling system such as cooling system 38. Cooling system 38, which may sometimes be referred to as a ventilation system, may include one or more fans and other equipment for removing heat from the components of device 10. Cooling system 38 may include structures that form airflow ports (e.g., openings in ventilation port structures located along slot 20 of FIG. 1 or other portions of device 10 through which cool air may be drawn by one or more cooling fans and through which air that has been warmed from heat produced by internal components may be expelled). Airflow ports, which may sometimes be referred to as cooling ports, ventilation ports, air exhaust and entrance ports, etc., may be formed from arrays of openings in plastic ventilation port structures or other structures associated with cooling system 38.

Radio-frequency transceiver circuitry 48 and antenna(s) 40 may be used to handle one or more radio-frequency communications bands. For example, circuitry 48 may include wireless local area network transceiver circuitry that may handle a 2.4 GHz band for WiFi® and/or Bluetooth® communications and, if desired, may include 5 GHz transceiver circuitry (e.g., for WiFi®). If desired, transceiver circuitry 48 and antenna(s) 40 may handle communications in other bands (e.g., cellular telephone bands, near field communications bands, bands at millimeter wave frequencies, etc.).

Transceiver circuitry 48 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, dielectric resonator antennas, hybrids of these designs, etc. If desired, one or more of antennas 40 may be cavity-backed antennas. Different types of antennas may be used for different bands and combinations of bands. If desired, antennas 40 may be arranged in one or more phased antenna arrays.

As shown in FIG. 2, transceiver circuitry 48 in wireless communications circuitry 34 may be coupled to antennas such as antenna 40 using radio-frequency transmission line paths such as transmission line 50. Transmission line paths in device 10 such as transmission line 50 may include coaxial cables, microstrip transmission lines, stripline transmission lines, edge-coupled microstrip transmission lines, edge-coupled stripline transmission lines, waveguide transmission lines (e.g., coplanar waveguides, grounded coplanar waveguides, etc.), transmission lines formed from combinations of transmission lines of these types, etc.

Transmission line paths in device 10 such as transmission line 50 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Transmission line 50 in device 10 may be coupled to antenna feed 42 of antenna 40. Antenna 40 of FIG. 2 may, for example, form an inverted-F antenna, a planar inverted-F antenna, a slot antenna, a hybrid inverted-F slot antenna or other antenna having an antenna feed such as antenna feed 42 with a positive antenna feed terminal such as positive antenna feed terminal 44 and a ground antenna feed terminal such as ground antenna feed terminal 46. Transmission line 50 may include a positive transmission line conductor 52 (sometimes referred to herein as signal conductor 52) and a ground transmission line conductor 54 (sometimes referred to herein as ground conductor 54). Signal conductor 52 may be coupled to positive antenna feed terminal 44 and ground conductor 54 may be coupled to ground antenna feed terminal 46. Other types of antenna feed arrangements may be used (e.g., indirect feed arrangements, feed arrangements in which antenna 40 is fed using multiple feeds, etc.) and multiple antennas 40 may be provided in device 10, if desired. The feeding configuration of FIG. 2 is merely illustrative.

Filter circuitry, switching circuitry, impedance matching circuitry, and other circuitry may be interposed within transmission line 50, in or between parts of antenna 40, or in other portions of wireless communications circuitry 34, if desired. Control circuitry 30 may be coupled to transceiver circuitry 48 and input-output devices 32. During operation, input-output devices 32 may supply output from device 10 and may receive input from sources that are external to device 10. Control circuitry 30 may use wireless communications circuitry 34 to transmit and receive wireless signals.

Figure 3:
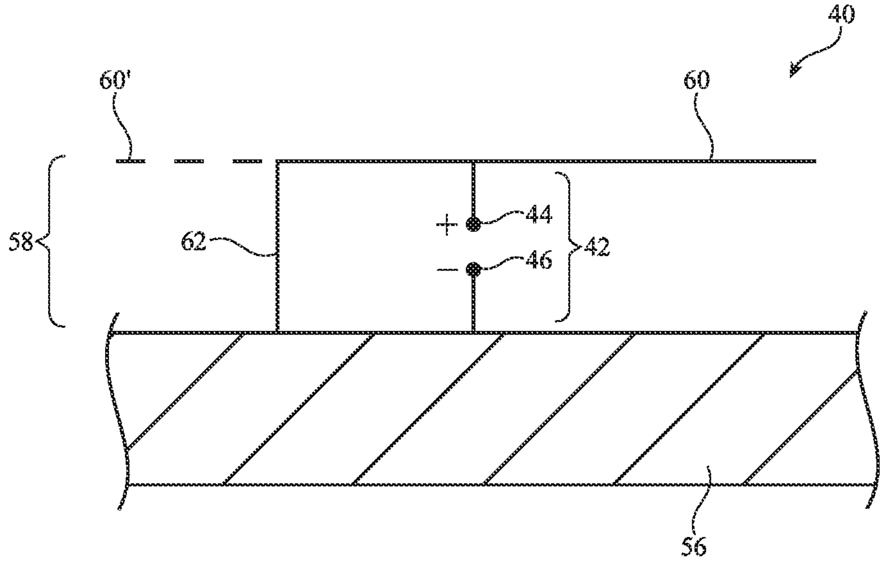
FIG. 3 is a diagram of an illustrative antenna in accordance with some embodiments.

FIG. 3 is a schematic diagram of an illustrative antenna for device 10. In the example of FIG. 3, antenna 40 is an inverted-F antenna having inverted-F antenna resonating element 58 and antenna ground 56 (sometimes referred to herein as ground plane 56, ground structures 56, antenna ground structures 56, or ground 56). Antenna resonating element 58 (sometimes referred to herein as antenna radiating element 58, resonating element 58, or radiating element 58) may have a main resonating element arm such as arm 60. If desired, antenna resonating element 58 may have multiple branches (e.g., a first branch formed from arm 60, a second branch formed from arm 60', etc.). The lengths of each of the branches of antenna resonating element 58 may be selected to support communications band resonances at desired frequencies (e.g., a high band resonance may be supported using a shorter branch such as arm 60' and a low band resonance may be supported using a longer branch such as arm 60). Antenna resonances may also be produced from resonating element harmonics and/or using parasitic antenna resonating elements.

As shown in FIG. 3, antenna resonating element 58 (e.g., arm 60) may be coupled to antenna ground 56 by return path 62. Antenna feed 42 may be coupled between arm 60 and antenna ground 56 in parallel with return path 62. Positive antenna feed terminal 44 may be coupled to arm 60. Ground antenna feed terminal 46 may be coupled to antenna ground 56. Antenna ground 56 may be formed from metal portions of housing 12 (e.g., portions of lower housing 12B of FIG. 1), metal traces on a printed circuit or other carrier/substrate, internal metal bracket members, sheet metal members, metal foil, and/or other conductive structures in device 10. This example is merely illustrative and in general, antenna 40 may include an antenna resonating element having any desired shape and architecture.

Figure 4:
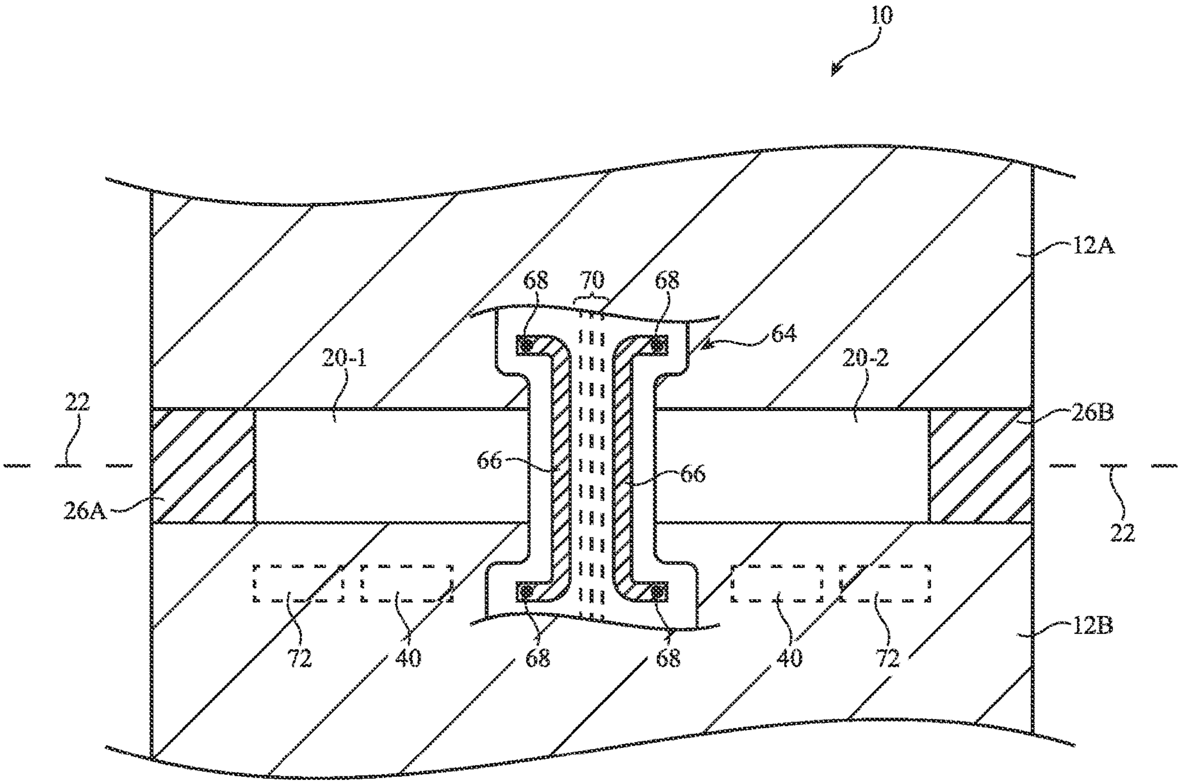
FIG. 4 is a diagram showing hinge and flexible printed circuit structures bridging a gap between upper and lower housings in a laptop computer of the type shown in FIG. 1 in accordance with some embodiments.

Metal traces on one or more flexible printed circuits may bisect slot 20 of FIG. 1. Consider, for example, the illustrative configuration of device 10 that is shown in FIG. 4. In the example of FIG. 4, upper housing 12A is separated from lower housing 12B by air-filled slot 20. Hinges 26A and 26B may be coupled between housings 12A and 12B along the respective left and right edges of device 10. One or more flexible printed circuits such as flexible printed circuit 64 may bisect slot 20 along the length of slot 20, thereby creating two slots (i.e., two separate slot-shaped portions of slot 20) such as slots 20-1 and 20-2. Flexible printed circuit 64 may contain one or more sheets of flexible dielectric substrate material such as a layer of polyimide or a sheet of other flexible polymers.

Flexible printed circuit 64 may include signal lines 70 for routing display signals (i.e., data signals associated with displaying images on display 14 of FIG. 1) and other signals (e.g., camera signals, backlight signals, power signals, touch sensor signals, etc.) between upper housing 12A and lower housing 12B. Ground traces 66 may be provided on the outer edges of flexible printed circuit 64 (i.e., in flexible printed circuit 64, signal lines 70 may be flanked on opposing sides by ground traces 66). Ground traces 66 may be formed from copper or other metal and may have any suitable widths (e.g., 1 mm to 3 mm, less than 1 mm, more than 1 mm, etc.). Ground traces 66 may be shorted to metal in housings 12A and 12B using screws, other fasteners, welds, conductive adhesive, solder, or other conductive coupling mechanism (see, e.g., conductive ground connections 68).

With this type of arrangement, slots (openings) 20-1 and 20-2 may be surrounded by metal. For example, slots 20-1 and 20-2 may be surrounded by metal portions of upper housing 12A and lower housing 12B on their top and bottom edges. Hinges 26A and 26B and ground traces 66 may also be formed from metal and may help define the shapes of slots 20-1 and 20-2. As shown in FIG. 4, slot 20-1 may have a left edge formed by hinge 26A and an opposing right edge formed from the ground traces on flexible printed circuit 64. Slot 20-2 may have a left edge formed from flexible printed circuit 64 and an opposing right edge formed from hinge 26-B. The example of FIG. 4 in which one flexible printed circuit divides slot 20 into two separate slots is merely illustrative. If desired, two or more flexible printed circuits may divide slot 20 into three or more separate slots. Two or more separate flexible printed circuits may divide slot 20 into two separate slots 20-1 and 20-2 if desired (e.g., two or more separate flexible printed circuits may be interposed between slots 20-1 and 20-2).

During wireless operation of device 10, slots 20-1 and 20-2 may serve as antenna apertures for respective electrically isolated antennas 40 in lower housing 12B of device 10. For example, a first antenna 40 may be mounted within lower housing 12B and aligned with slot 20-1 and a second antenna 40 may be mounted within lower housing 12B and aligned with slot 20-2. Conductive structures in lower housing 12B may form cavity structures for each of the antennas 40 (e.g., cavity-shaped ground structures or other ground structures that form part of antenna ground 56 of FIG. 3). By aligning antennas 40 with separate slots between lower housing 12B and upper housing 12A in device 10, the antennas may exhibit sufficient electrical isolation from each other (e.g., such that the antennas may be used to form a multiple-input-multiple-output (MIMO) antenna array at 2.4 GHz and/or 5 GHz and/or other suitable frequencies for wireless local area network communications, etc.).

Device 10 may have ventilation port structures such as ventilation port structures 72 mounted along the rear edge of lower housing 12B or elsewhere in device 10. Ventilation port structures 72 may have arrays of openings that form ventilation ports. Fans in cooling system 38 (FIG. 2) may be used to draw air into lower housing 12B through the openings and may be used to exhaust air that has been warmed by the circuitry in lower housing 12B through the openings. Separate ventilation port structures 72 may be aligned with slots 20-1 and 20-2 if desired. For example, a first ventilation port structure 72 may be interposed between the antenna 40 aligned with slot 20-1 and hinge 26A whereas a second ventilation port structure 72 is interposed between the antenna 40 aligned with slot 20-2 and hinge 26B. In another suitable arrangement, ventilation port structures 72 may be interposed between antennas 40 and flexible printed circuit 64. If desired, multiple antennas 40 may be aligned with slot 20-1 and/or multiple antennas 40 may be aligned with slot 20-2.

Figure 5:
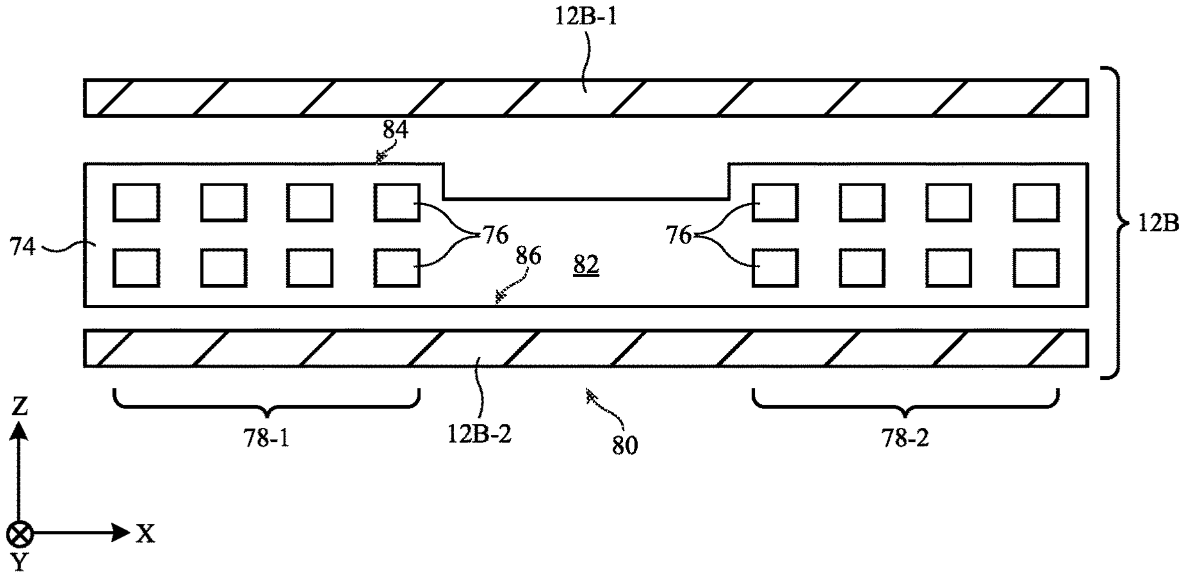
FIG. 5 is a rear (exterior) view of a lower laptop computer housing having a ventilation system in accordance with some embodiments.

An illustrative ventilation port structure of the type that may be formed along the rear edge of lower housing 12B is shown in the rear view of lower housing 12B of FIG. 5. In the example of FIG. 5, lower housing 12B has conductive upper wall 12B-1 and conductive lower wall 12B-2. The ventilation port structure in lower housing 12B (e.g., ventilation port structure 72 of FIG. 4) may include a ventilation port substrate 74. Ventilation port substrate 74 may be mounted along the rear edge of lower housing 12B between conductive upper wall 12B-1 and conductive lower wall 12B-2.

Substrate 74 may have a top surface 84 facing conductive upper wall 12B-1 and may have an opposing bottom surface 86 facing conductive lower wall 12B-2 (e.g., substrate 74 may be disposed within the interior of lower housing 12B such that top surface 84 is at or adjacent to conductive upper wall 12B-1 and bottom surface 86 is at or adjacent to conductive lower wall 12B-2). Substrate 74 may have an exterior (rear) facing surface such as rear surface 82 that faces the exterior of lower housing 12B. Substrate 74 may also have an opposing interior (front facing) surface opposite rear surface 82. Rear surface 82 may sometimes be referred to herein as rear-facing surface 82, exterior-facing surface 82, exterior surface 82, rear face 82, or exterior face 82. Substrate 74 may be formed from plastic, ceramic, polyimide, or any other desired dielectric materials.

Ventilation port substrate 74 may have ventilation port openings 76. Openings 76 may be used to allow air to enter and exit the interior of lower housing 12B. There may be one or more openings 76 associated with each airflow entrance location and each airflow exit location in substrate 74. Openings 76 may, if desired, be arranged in arrays (ventilation ports) 78 such as a first array 78-1 and a second array 78-2 (e.g., arrays of 6-20 openings, more than 4 openings, fewer than 30 openings, etc.). One or more flexible printed circuits (e.g., flexible printed circuit 64 of FIG. 4) may be interposed between two or more opening(s) 76 (e.g., at location 80 between arrays 78-1 and 78-2 as shown in FIG. 5).

Figure 6:
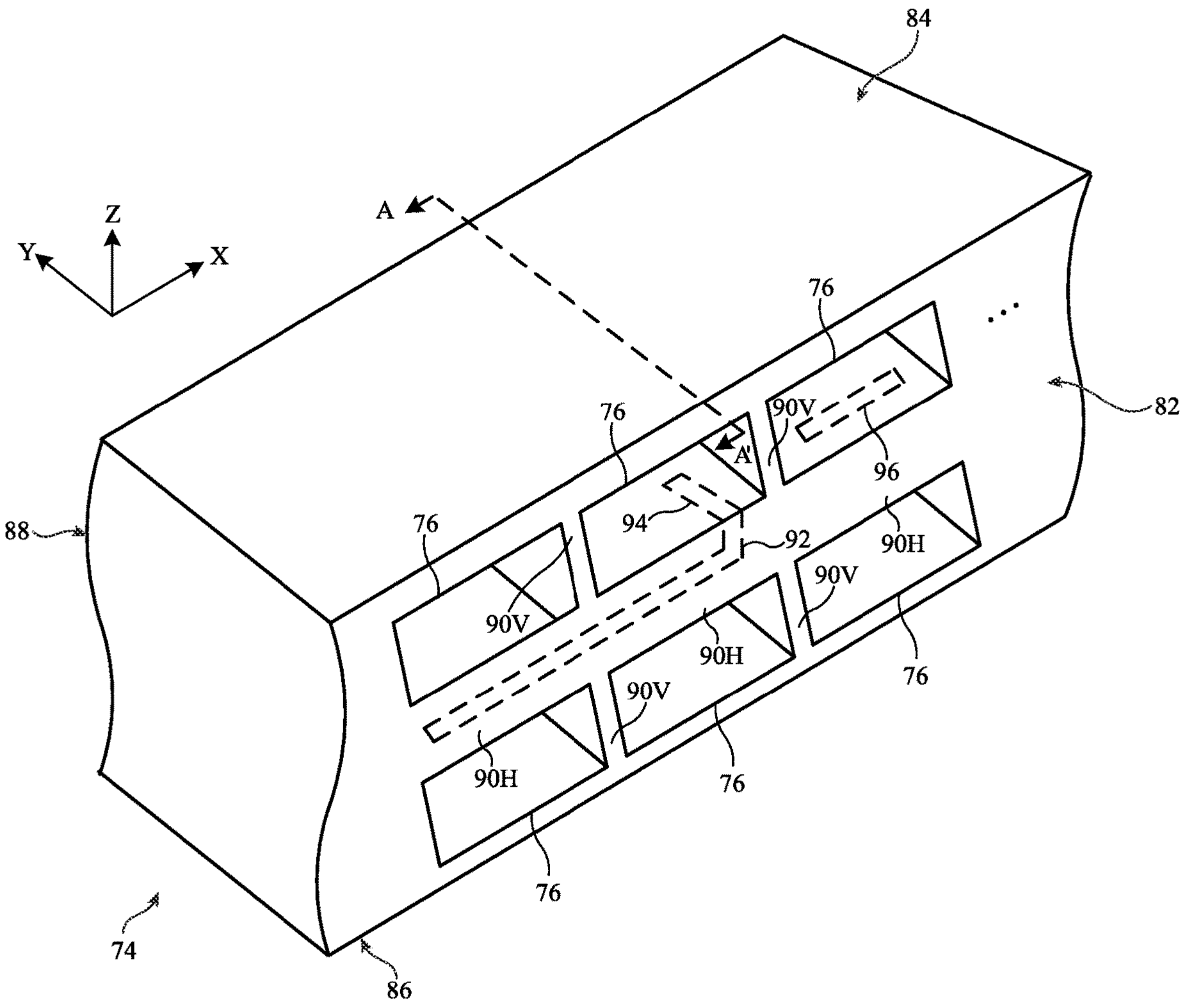
FIG. 6 is a rear (exterior) perspective view of an illustrative ventilation port substrate that may serve as an antenna carrier for an electronic device in accordance with some embodiments.

FIG. 6 is a rear perspective view of a portion of substrate 74 showing how openings 76 may be provided in substrate 74 to allow air to flow into and out of device 10. In the example of FIG. 6, openings 76 have rectangular outlines. This is merely illustrative. Any suitable shapes (circular, oval, triangular, etc.) may be used in forming openings 76.

As shown in FIG. 6, substrate 74 may have a front (interior) facing surface such as front surface 88 that faces the interior of lower housing 12B (FIG. 5) when substrate 74 is mounted within lower housing 12B. Front surface 88 may sometimes be referred to herein as front-facing surface 88, interior-facing surface 88, interior surface 88, front face 88, or interior face 88. Openings 76 may extend from rear surface 82 to front surface 88 through substrate 74. Openings 76 are cavities that are generally free from material (e.g., plastic from substrate 74) to allow for the passage of air through openings 76. If desired, two or more openings 76 at rear surface 82 may merge to a single shared opening at front surface 88 of substrate 74.

Substrate 74 may include ribs 90 that separate each opening 76 from one or more other openings 76. In the example of FIG. 6, substrate 74 includes two rows of openings 76 that are separated by a horizontal rib 90H. This is merely illustrative and, in general, openings 76 may be arranged in any desired pattern. Substrate 74 also includes vertical ribs 90V that separate each opening 76 from a laterally adjacent opening 76 in its row. Vertical ribs 90V may sometimes be referred to herein as vertical walls 90V (e.g., vertical walls defining the vertical left/right edges of openings 76), sidewalls 90V (e.g., sidewalls of openings 76), or simply as walls 90V. Similarly, horizontal ribs 90H may sometimes be referred to herein as horizontal walls 90H (e.g., horizontal walls defining the horizontal top/bottom edges of openings 76) or simply as walls 90H.

Antenna structures may be supported by one or more dielectric support structures in device 10. For example, metal traces, metal foil, sheet metal structures, or other conductive structures for antenna(s) 40 may be supported on plastic structures or other dielectric structures. With one illustrative arrangement which may sometimes be described herein as an example, some or all of the conductive structures that form antenna(s) 40 (e.g., portions of antenna resonating element 58 and/or antenna ground 56 of FIG. 3, feed and return path structures, etc.) may be formed on a plastic structure such as substrate 74 of FIGS. 5 and 6 that is also used for forming some or all of a ventilation system (e.g., cooling system 38 of FIG. 2) for device 10.

Since rear surface 82 of substrate 74 faces the exterior of device 10 while mounted within lower housing 12B (FIG. 5), disposing antenna 40 (e.g., antenna resonating element 58 of FIG. 3) on rear surface 82 (e.g., at location 92 of FIG. 6) may allow antenna 40 to freely convey radio-frequency signals with external equipment with maximum antenna efficiency. When mounted at location 92, some of the antenna may extend into one or more of openings 76 such as at location 94. This may serve to increase the resonant length of the antenna (e.g., for maximizing antenna efficiency at lower frequencies).

However, disposing antenna 40 on rear surface 82 of substrate 74 may expose antenna 40 to external forces and contaminants that may damage antenna 40 and/or that may detune or deteriorate the performance of antenna 40 over time. For example, when device 10 is in a closed-lid configuration and placed rear-first vertically onto a surface (e.g., when device 10 is placed within a messenger bag, purse, satchel, or other portable container), the surface may impact device 10 in a way that causes excessive force to be applied at rear surface 82 of substrate 74 and thus to an antenna 40 at location 92. These forces may damage the antenna and may deteriorate antenna performance over time. In addition, debris, dust, or items located on the surface may become lodged within lower housing 12B at or adjacent to rear surface 82 and can undesirably block or damage an antenna 40 at location 92.

To help mitigate these external factors, an entirety the antenna resonating element for the antenna (or an entirety of antenna 40) may be located within a corresponding ventilation duct 76, such as at location 96 of FIG. 6. In these configurations, no part of the antenna resonating element (or no part of antenna 40) is located on rear surface 82 (e.g., rear surface 82 may be free from conductive material in the antenna resonating element or antenna 40). However, substrate 74 may be relatively narrow (e.g., as measured from rear surface 82 to front surface 88) to minimize device form factor and to maximize the amount of space in lower housing 12B (FIG. 1) that is available for other device components. As such, opening 76 may not be sufficiently long on its own to accommodate the entire length of the antenna resonating element in antenna 40, particularly for covering relatively low frequencies.

To optimize the radio-frequency performance of antenna 40 across all frequencies of interest while minimizing the effect of external forces and contaminants on antenna 40, antenna 40 may be disposed within (e.g., distributed between) multiple openings 76. Substrate 74 may include structures at front surface 88 that allow antenna 40 to extend between multiple openings 76 at the interior-facing side of substrate 74 without exposing the antenna at rear surface 82. These structures may include notches or recesses in the ribs of substrate 74 that accommodate antenna 40 as the antenna extends between multiple openings 76. Part of the antenna 40 may be patterned directly onto the wall(s) of the notches or recesses in the ribs of substrate 74 and/or the antenna 40 may pass through the notches or recesses without being patterned onto the walls of the notches or recesses.

Figure 7:
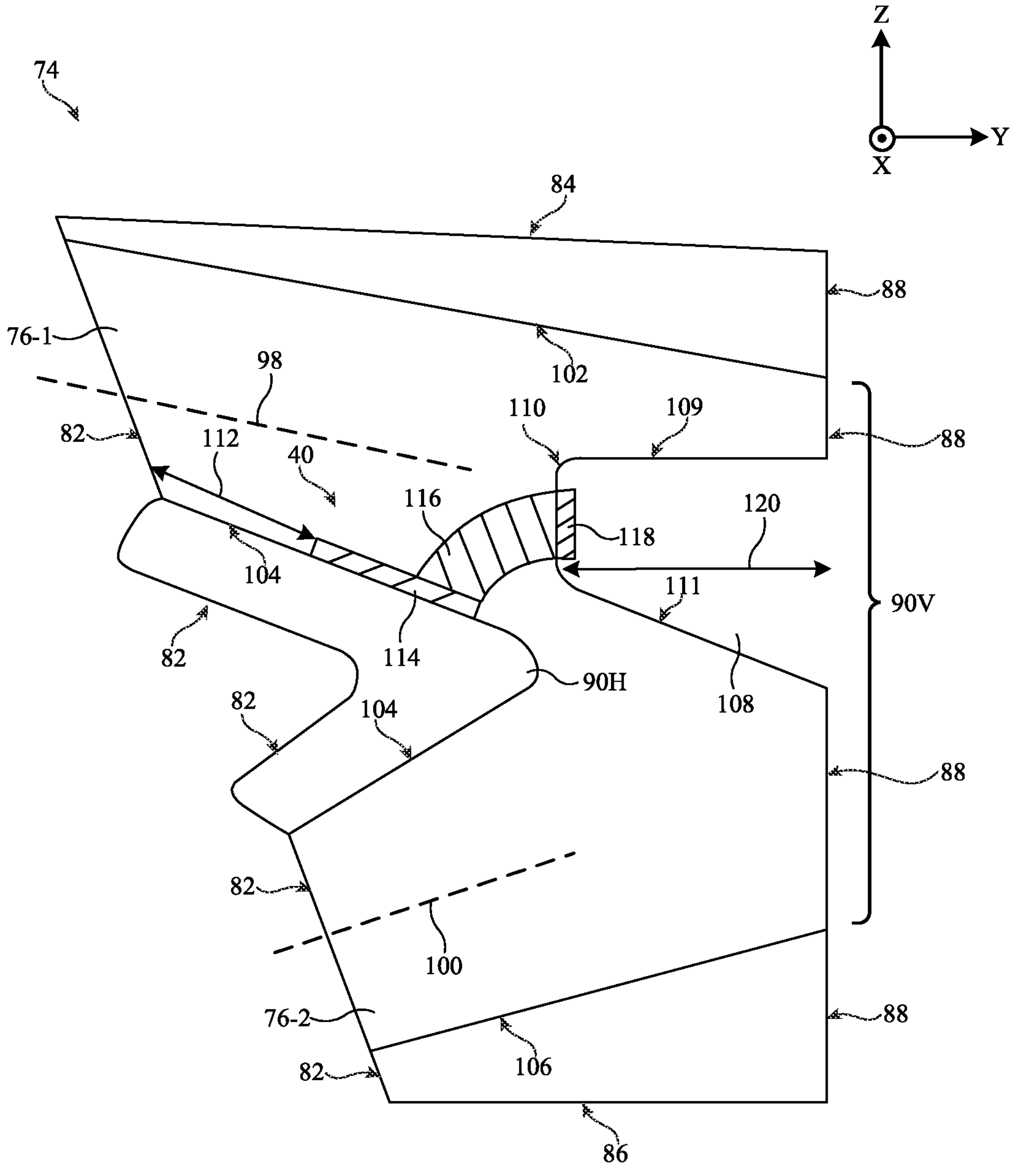
FIG. 7 is a cross-sectional side view of an illustrative ventilation port substrate having an antenna that extends along the wall of a notched rib in accordance with some embodiments.

FIG. 7 is a cross-sectional side view (e.g., as taken along line AA' of FIG. 6) showing how substrate 74 may include a notch or recess at front surface 88 for accommodating antenna 40. As shown in FIG. 7, substrate 74 may include a first opening 76-1 (e.g., from the first row of openings 76 in FIG. 6) and a second opening 76-2 (e.g., from the second row of openings 76 in FIG. 6) beneath first opening 76-1.

In the example of FIG. 7, opening 76-1 and opening 76-2 form two respective ventilation port openings at rear surface 82 of substrate 74 but merge together to form a single opening at front surface 88 of substrate 74. As such, opening 76-1 extends along a first longitudinal axis 98 and opening 76-2 extends along a second longitudinal axis 100 that is oriented non-parallel with respect to first longitudinal axis 98. Opening 76-1 may exhibit symmetry about longitudinal axis 98 and opening 76-2 may exhibit symmetry about longitudinal axis 100 if desired. Rear surface 82 may be oriented non-parallel with respect to front surface 88 if desired.

Opening 76-1 is separated from opening 76-2 (at rear surface 82) by horizontal rib 90H of substrate 74. In the example of FIG. 7, horizontal rib 90H has a chevron-shaped profile (e.g., in the Y-Z plane). Horizontal rib 90H has a first surface that forms a curved (e.g., concavely curved) portion of the rear surface 82 of substrate 74 and has an opposing second surface 104 that faces the front face of substrate 74. Surface 104 of horizontal rib 90H may form the bottom (lower) edge, surface, or wall of opening 76-1 and may form the top (upper) edge, surface, or wall of opening 76-2. Opening 76-1 may have a top (upper) edge 102 opposite surface 104 of horizontal rib 90H. Opening 76-2 may have a bottom (lower) edge 106 opposite surface 104 of horizontal rib 90H. The example of FIG. 7 is merely illustrative and, in general, openings 76-1 and 76-2 may have other shapes or profiles as the openings extend from rear surface 82 to front surface 88. The openings need not merge at front surface 88.

As shown in FIG. 7, substrate 74 may include a vertical rib 90V that extends perpendicular to horizontal rib 90H. For example, horizontal rib 90H may have a longitudinal axis that extends parallel to the X-axis (e.g., to separate the first and second rows of openings 76 as shown in FIG. 6) whereas vertical rib 90V extends within the Y-Z plane of FIG. 7. Vertical rib 90V may separate openings 76-1 and 76-2 from third and fourth openings located farther in the −X direction of FIG. 7 than openings 76-1 and 76-2.

Vertical rib 90V may have a notch (recess) 108 at front surface 88. Notch 108 may extend into opening 76-1 by distance 120 from an open end to an opposing closed end at rear wall 110 of notch 108 (e.g., rear wall 110 may form a portion of front surface 88 that is offset from the inner-most portion of front surface 88 by notch 108). Distance 120 may be 1-6 mm, as an example. Notch 108 may have an upper edge 109 and a lower edge 111 that extends from the open end to rear wall 110 (sometimes referred to herein as notch wall 110 or notch rear wall 110). Upper edge 109 may extend parallel to or non-parallel to lower edge 111. Upper edge 109 and lower edge 111 need not be linear and may, if desired, have a curved shape, stepped shape, or other shapes. The example of FIG. 7 in which notch 108 extends only into opening 76-1 is merely illustrative. If desired, notch 108 may extend into both openings 76-1 and 76-2 or only into opening 76-2. Rear wall 110 of notch 108 may be located within the merged portion of openings 76-1 and 76-2 (e.g., as shown in FIG. 7), may be vertically interposed between surface 104 of horizontal rib 90H and top edge 102 of opening 76-1, or may be vertically interposed between surface 104 of horizontal rib 90H and bottom edge 106 of opening 76-2.

As shown in FIG. 7, antenna 40 may be disposed within opening 76-1. Antenna 40 may include conductive trace 114 on surface 104 of horizontal rib 90H, conductive trace 114 on the vertical surface of vertical rib 90V, and conductive trace 118 on rear wall 110 of notch 108. Conductive traces 114, 116, and 118 may form all or part of antenna resonating element 58 (e.g., arm 60) and/or antenna ground 56 of FIG. 3. Conductive trace 116 may couple conductive trace 114 to conductive trace 118. Conductive trace 118 may couple the conductive traces of antenna 40 within opening 76-1 to conductive traces in antenna 40 that are located within the opening in substrate 74 located on the side of vertical rib 90V opposite to opening 76-1 (e.g., conductive trace 118 may couple conductive trace 116 to additional conductive traces on the opposing side of vertical rib 90V and/or on the portion of horizontal rib 90H located within the opening in substrate 74 located on the side of vertical rib 90V opposite to opening 76-1).

When disposed in this way, conductive trace 114 may be laterally separated (offset) from rear surface 82 of substrate 74 by distance 112. Distance 112 may be adjusted to tune the performance of antenna 40. For example, shorter distances 112 may place antenna 40 closer to the exterior of device 10, thereby increasing antenna efficiency, whereas longer distances 112 may better protect antenna 40 from external forces and contaminants, thereby extending the overall longevity of the antenna. Distance 112 may be selected to optimize these two factors (e.g., distance 112 may be between around 0.1-10 mm). The example of FIG. 7 is merely illustrative. If desired, antenna 40 may be disposed entirely within opening 76-2 or may be distributed between openings 76-1 and 76-2 (e.g., conductive trace 114 may extend onto the portion of surface 104 that defines an edge of opening 76-2).

Figure 8:
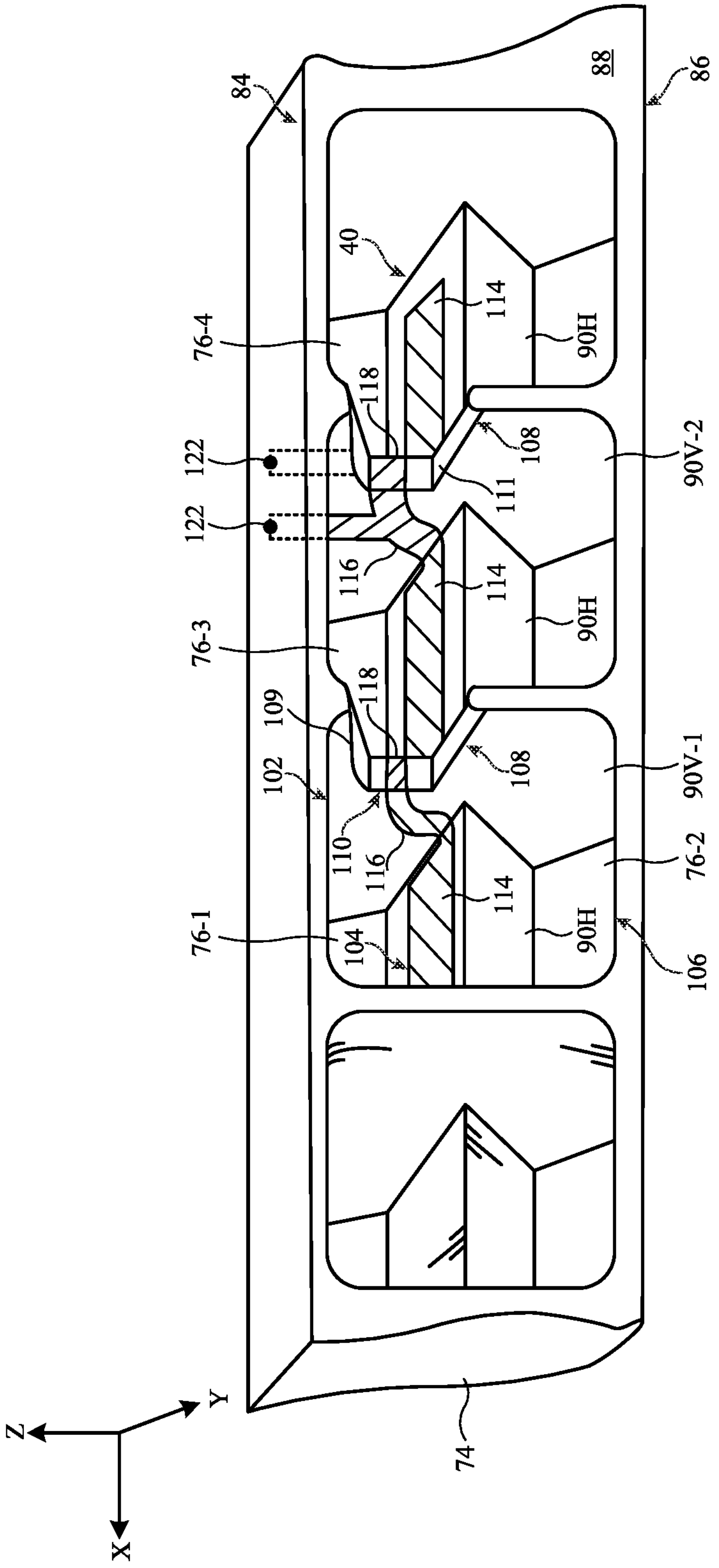
FIG. 8 is a front (interior) perspective view of an illustrative ventilation port substrate having an antenna that extends along the walls of multiple notched ribs for distributing the antenna across multiple ventilation ports in accordance with some embodiments.

FIG. 8 is an interior perspective view (e.g., as viewed in the −Y direction of FIG. 7) showing how antenna 40 may be distributed across multiple openings 76 in substrate 74. As shown in FIG. 8, front surface 88 of substrate 74 faces the interior of lower housing 12B when substrate 74 is mounted within lower housing 12B. Antenna 40 may extend across at least three laterally-adjacent openings 76 in substrate 74 (e.g., openings 76-1, 76-3, and 76-4 within a first row of openings in substrate 74). This is merely illustrative and, if desired, antenna 40 may extend across only two openings 76, across more than three openings 76, across openings in more than one row of openings, etc.

Substrate 74 may include a first vertical rib 90V-1 that separates opening 76-1 from opening 76-3 and may include a second vertical rib 90V-2 that separates opening 76-3 from opening 76-4. Vertical rib 90V-1 and vertical rib 90V-2 may each include a respective notch 108 at front surface 88 of substrate 74 (e.g., where each notch 108 has edges 111 and 109 extending from the interior-most portion of front surface 88 to a respective rear wall 110 formed from a portion of the vertical rib). Horizontal rib 90H may separate openings 76-1, 76-3, and 76-4 from the second row of openings in substrate 74 (e.g., at the rear surface of substrate 74).

Antenna 40 may include conductive traces 114 located (patterned) on surface 104 of horizontal rib 90H within openings 76-1, 76-3, and 76-4. Antenna 40 may also include conductive traces 116 located on the surface of vertical rib 90V-1 defining an edge of opening 76-1, on the surface of vertical rib 90V-1 defining an edge of opening 76-3, on the surface of vertical rib 90V-2 defining an edge of opening 76-3, and on the surface of vertical rib 90V-4 defining an edge of opening 76-4. Antenna 40 may further include conductive traces 118 located on rear walls 110 of the notches 108 in vertical ribs 90V-1 and 90V-2. In other words, antenna 40 (e.g., the antenna resonating element or resonating element arm for antenna 40) may extend from opening 76-1, through notch 108 in vertical rib 90V-1, through opening 76-2, through notch 108 in vertical rib 90V-2, and into opening 76-3. If desired, conductive traces 116 (e.g., on vertical rib 90V-2) may be coupled to terminals 122 on top surface 84 of substrate 74. Terminals 122 may alternatively be located on bottom surface 86 of substrate 74. Terminals 122 may be used to form one or both of positive antenna feed terminal 44 and ground antenna feed terminal 46 and/or to form a return path 62 (FIG. 3) for antenna 40. The radio-frequency transmission line for antenna 40 may be coupled to one or both of terminals 122. If desired, additional conductive traces may be patterned on top surface 84 and/or bottom surface 86 of substrate 74 to form part of the transmission line for antenna 40 and/or for forming part of the antenna ground for antenna 40.

In this way, antenna 40 may be distributed across multiple openings 76 in substrate 74 to maximize the length of the antenna resonating element and thus antenna efficiency at relatively low frequencies. Separating antenna 40 from the rear surface of substrate 74 in this way may prevent antenna 40 from being subject to destabilizing external forces and contaminants. Forming notches 108 in vertical ribs 90V at the front surface 88 of substrate 74 may allow antenna 40 to pass between openings 76 without exposing any part of the antenna at the rear surface of substrate 74. Patterning part of antenna 40 onto rear walls 110 of notches 108 (e.g., at distance 120 from the inner-most portion of front surface 88 as shown in FIG. 7) may allow an entirety of the antenna resonating element to be located as close to the rear face of substrate 74 as possible (e.g., to maximize antenna efficiency) while also optimizing the radiation pattern for the antenna relative to scenarios where notches 108 are omitted.

Figure 9:
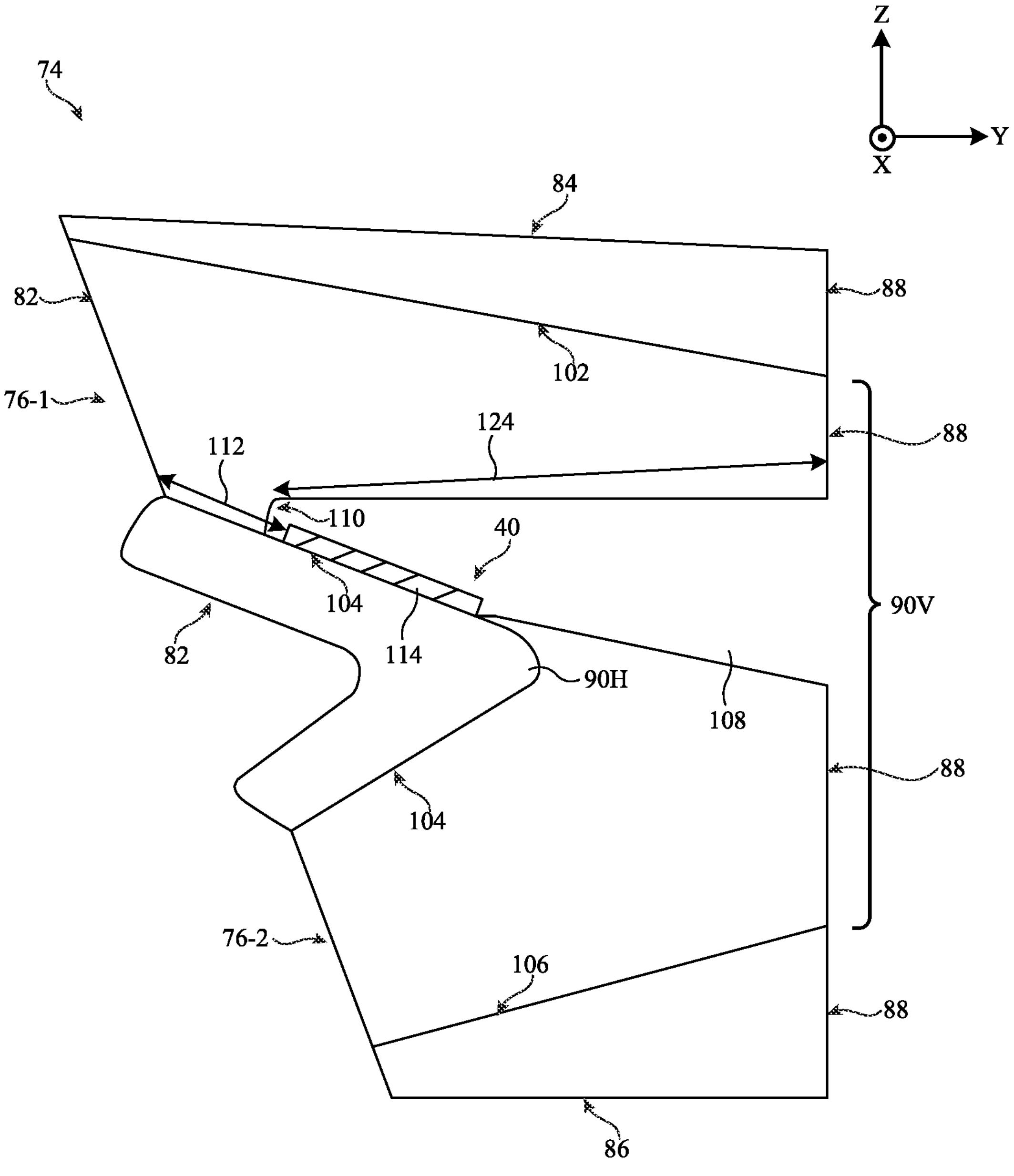
FIG. 9 is a cross-sectional side view of an illustrative ventilation port substrate having an antenna that extends along a horizontal rib and through a notched vertical rib in accordance with some embodiments.

The example of FIG. 8 is merely illustrative. The conductive traces used to form antenna 40 may have any desired shape. If desired, the conductive traces may pass between openings 76-1, 76-3, and 76-4 and through notches 108 without being patterned onto rear wall 110 of the notches. FIG. 9 is a cross-sectional side view showing how antenna 40 may be disposed in opening 76-1 for passing through notch 108 without being patterned onto the rear wall of the notch.

As shown in FIG. 9, notch 108 may extend by distance 124 into opening 76-1 (e.g., where distance 124 is greater than distance 120 of FIG. 7). Distance 124 may be 3-9 mm, for example. Distance 124 and distance 122 of FIG. 7 may sometimes be referred to herein as the length of notch 108. This example is merely illustrative. If desired, notch 108 may extend into both openings 76-1 and 76-2 or into only opening 76-2. Openings 76-1 and 76-2 need not be merged at front surface 88. Distance 124 may be sufficiently far so as to allow conductive trace 114 of antenna 40 to extend along surface 104 of horizontal rib 90H into the adjacent opening parallel to the X axis without extending up onto any portion of the vertical surface(s) of vertical rib 90V. In other words, conductive trace 114 may pass through notch 108 without being patterned onto any of the surfaces of vertical rib 90V.

Figure 10:
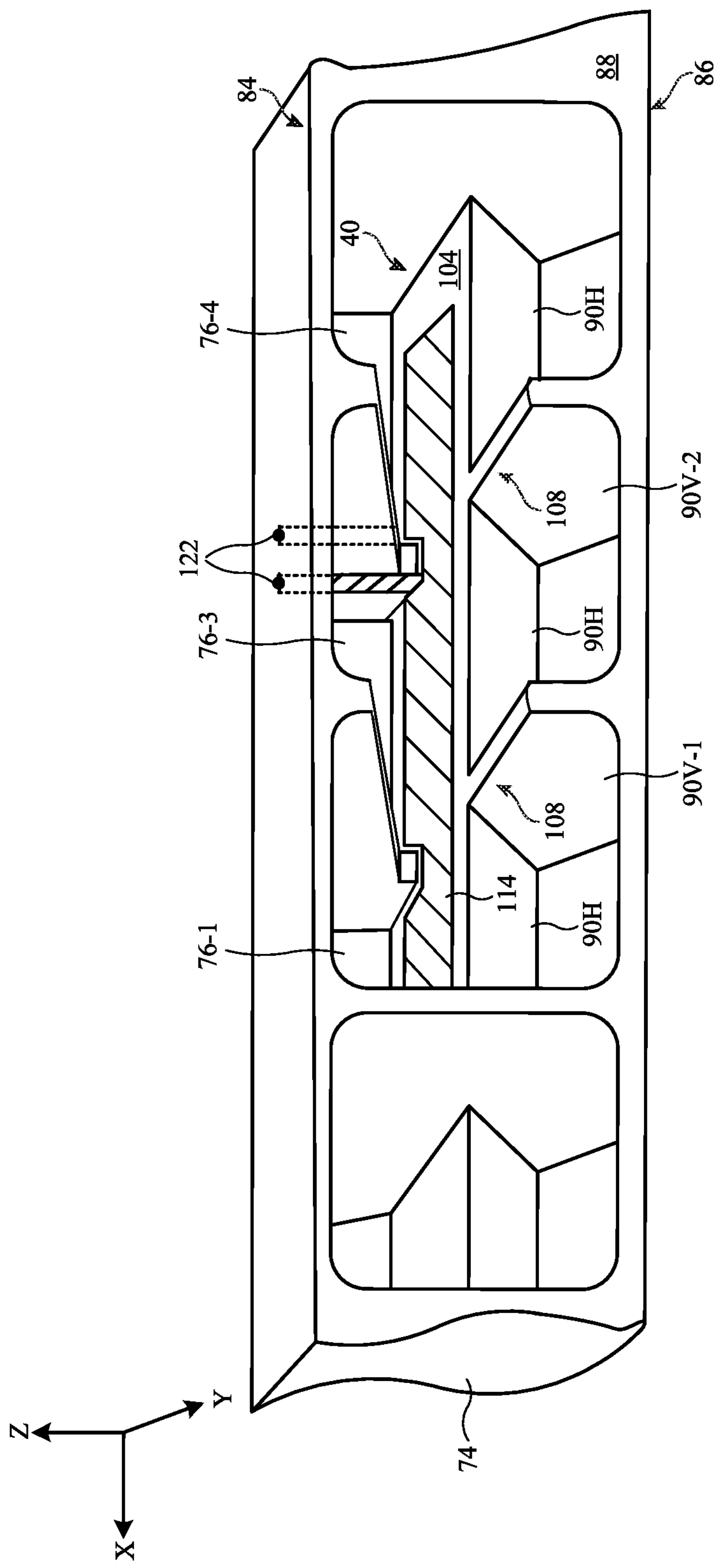
FIG. 10 is a front (interior) perspective view of an illustrative ventilation port substrate having an antenna on a horizontal rib and extending through multiple notched vertical ribs for distributing the antenna across multiple ventilation ports in accordance with some embodiments.

FIG. 10 is an interior perspective view showing how antenna 40 may include conductive traces 114 on horizontal rib 90H that pass from opening 76-1 through opening 76-3 and into opening 76-4 through notches 108 in vertical ribs 90V-1 and 90V-2 without being patterned onto any part of vertical ribs 90V-1 and 90V-2. If desired, conductive traces may be patterned on one or more vertical ribs to couple conductive traces 114 to terminals 122. Disposing antenna 40 in this way may further increase its antenna efficiency (e.g., by pushing more of the antenna closer to the rear surface of substrate 74) and/or may simplify the manufacturing complexity of device 10 relative to the arrangement of FIGS. 7 and 8. Use of conductive traces on notches 108 may simplify the manufacturing complexity of substrate 74, may reduce the volume occupied by substrate 74, may reduce the weight of device 10, may maximize the mechanical reliability of antenna 40, and may maximize the antenna efficiency of antenna 40 relative to scenarios where conductive vias are used to couple conductive traces in different ventilation ports together.

The example of FIG. 10 is merely illustrative. Antenna 40 may extend into any desired number of openings 76 in any desired number of rows of openings. If desired, a combination of the arrangement of FIGS. 7 and 8 and the arrangement of FIGS. 9 and 10 may be used (e.g., some portions of antenna 40 may be patterned onto rear wall 110 of the notch 108 in one or more vertical ribs 90V whereas other portions of antennas 40 pass through the notch 108 in one or more vertical ribs 90V without being patterned onto the corresponding rear wall 110). Put differently, the notches 108 in vertical ribs 90V may have different lengths if desired.

Figure 11:
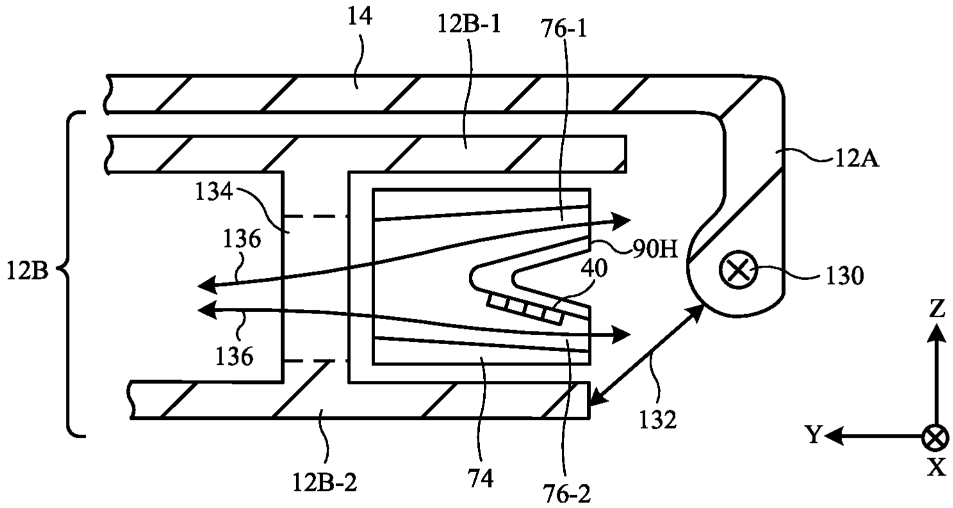
FIGS. 11 and 12 are cross-sectional side views of an illustrative laptop computer (in closed-lid and open-lid configurations) showing how the ventilation port substrate of FIGS. 5-10 may minimize exposure of an antenna on the substrate to external forces and contaminants in accordance with some embodiments.

FIG. 11 is a cross-sectional side view of device 10 in the vicinity of the rear edge of lower housing 12B when upper housing 12A is in a closed position (sometimes referred to herein as a closed lid configuration) after rotating upper housing 12A about rotational axis 130 (e.g., axis 22 of FIG. 1). As shown in FIG. 11, the lateral surface of conductive upper wall 12B-1 may extend parallel or substantially parallel (e.g., within 30 degrees) to the lateral surface of conductive lower wall 12B-2. Conductive upper wall 12B-1 and conductive lower wall 12B-2 may define the interior of lower housing 12B. A main logic board, battery 36 (FIG. 2), a set of input-output devices 32, cooling system 38, transceiver circuitry 48, control circuitry 30, and other desired components may be mounted within the interior of lower housing 12B. Substrate 74 may be mounted within the interior of lower housing 12B between conductive upper wall 12B-1 and conductive lower wall 12B-2. By mounting substrate 74 in this way, an entirety of the antenna resonating element and substrate 74 may be interposed between conductive upper wall 12B-1 and conductive lower wall 12B-2 within the interior of lower housing 12B. This may, for example, hide antenna 40 from view of a user at the exterior of device 10 and may protect antenna 40 from contaminants or damage.

Components such as keyboard 16 and track pad 18 (FIG. 1) may operate through openings in conductive upper wall 12B-1. Conductive lower wall 12B-2, which may be joined to conductive upper wall 12B-1 around the lateral periphery of lower housing 12B (e.g., such that conductive material surrounds the interior cavity and thus substrate 74), may have feet or other support structures that allow device 10 to rest on a tabletop, a user's lap, or other support structure during operation. Fans and other cooling system structures (cooling system 38 of FIG. 2) may be mounted within the interior of lower housing 12B. Conductive upper wall 12B-1 may be electrically coupled to conductive lower wall 12B-2 using conductive structure 134. Conductive structure 134 may be a conductive gasket formed from conductive foam, conductive fabric, a solid elastomeric conductive material, or other conductive material.

An opening may be provided in conductive structure 134 to form an air passageway (ventilation opening) that is aligned with the openings 76 in substrate 74. When device 10 is being used in this way, air may flow in and out of ventilation port structure 72 (FIG. 4) through openings 76 in substrate 74, as shown by arrows 136. Openings 76 in substrate 74 (e.g., openings 76-1 and 76-2 of FIG. 11) may allow (intake) air to pass from the right of substrate 74 to the left of substrate 74 and/or may allow (exhaust) air to pass from the left of substrate 74 to the right of substrate 74. In the closed lid configuration, conductive material in upper housing 12A may be separated from conductive material in lower housing 12B by slot 132. Antenna 40 may convey radio-frequency signals through slot 132. Disposing antenna 40 within openings 76 and displaced from the rear surface of substrate 74 may protect antenna 40 from force and contaminants received through slot 132 (e.g., when device 10 is placed rear-edge down in a bag or on a surface).

Figure 12:
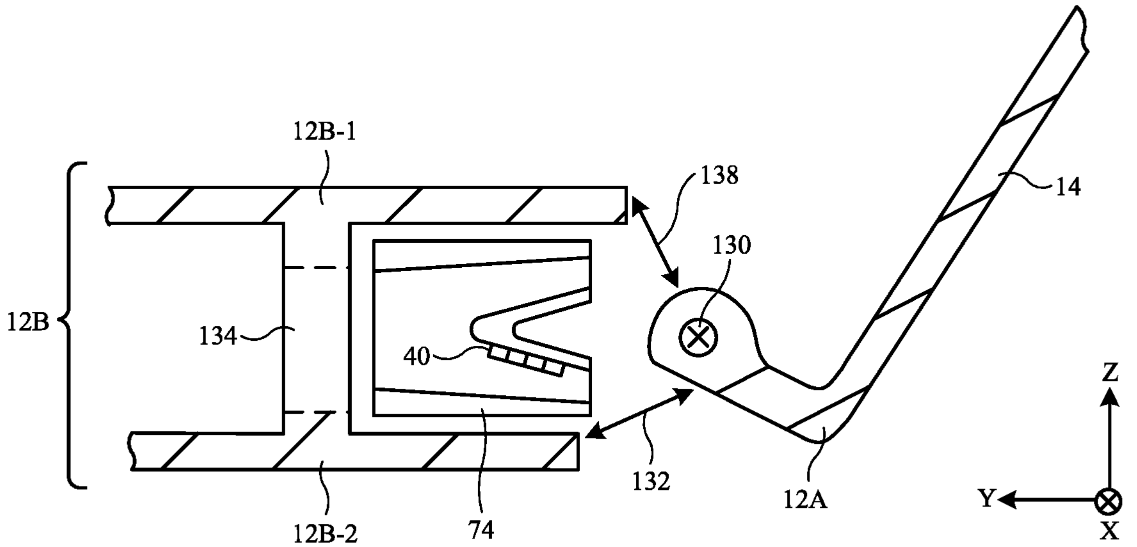

FIG. 12 shows device 10 in an illustrative lid-open configuration in which upper housing 12A has been rotated into an open position about rotational axis 130. Conductive upper wall 12B-1 may be separated from conductive material in upper housing 12A by slot 138 whereas conductive lower wall 12B-2 is separated from conductive material in upper housing 12A by slot 132. Antenna 40 may convey radio-frequency signals through slots 138 and 132. The examples of FIGS. 11 and 12 in which antenna 40 is disposed within opening 76-2 is merely illustrative. If desired, antenna 40 may be disposed within opening 76-1 or within both openings 76-1 and 76-2. Antenna 40 may extend across multiple openings as shown in the examples of FIGS. 7-10.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
a first conductive housing wall;
a second conductive housing wall;
a substrate disposed between the first and second conductive housing walls, wherein the substrate includes
a first ventilation port opening,
a second ventilation port opening,
a rib that separates the first ventilation port opening from the second ventilation port opening, and
a notch having a closed end formed from a portion of the rib and an open end opposite the closed end; and
an antenna radiating element on the substrate and extending, through the notch, from the first ventilation port opening to the second ventilation port opening, wherein the antenna radiating element comprises a conductive trace on the portion of the rib that forms the closed end of the notch.

2. The electronic device of claim 1, wherein the substrate comprises a plastic substrate.

3. The electronic device of claim 1, further comprising:
a lower housing portion that includes the first and second conductive housing walls;
an upper housing portion coupled to the lower housing portion by a hinge; and a display in the upper housing portion, wherein the antenna radiating element is configured to radiate through a slot between the lower housing portion and the upper housing portion.

4. The electronic device of claim 3, wherein the substrate has a first surface facing the slot and a second surface opposite the first surface, the first and second ventilation port openings extend through the substrate from the first surface to the second surface, and the antenna radiating element is separated from the second surface by a non-zero distance within the notch.

5. The electronic device of claim 4, wherein none of the antenna radiating element is located on the first surface.

6. The electronic device of claim 4, wherein the notch extends from the second surface towards the first surface.

7. The electronic device of claim 1, wherein the substrate comprises an additional rib that extends orthogonal to the rib and that separates the first ventilation port opening from a third ventilation port opening in the substrate.

8. The electronic device of claim 7, wherein the additional rib separates the first ventilation port opening from the second ventilation port opening at a first face of the substrate, the substrate has a second face opposite the first face, and the first ventilation port opening is merged with the second ventilation port opening at the second face.

9. An electronic device comprising:

a housing having an upper housing portion that contains a display and having a lower housing portion, wherein the lower housing portion has opposing first and second conductive walls;

a hinge that couples the upper housing portion to the lower housing portion, wherein the upper housing portion is rotatable with respect to the lower housing portion and is separated from the lower housing portion by at least one slot;

a substrate disposed in the lower housing portion between the first and second conductive walls, wherein the substrate has a first surface that faces an interior of the lower housing portion and a second surface that faces the at least one slot;

first and second ventilation ports in the substrate and extending from the second surface towards the first surface; and an antenna configured to radiate through the at least one slot and having a first conductive trace in the first ventilation port, a second conductive trace in the second ventilation port, and a third conductive trace that couples the first conductive trace to the second conductive trace, wherein the first, second, and third conductive traces are offset from the second surface of the substrate.

10. The electronic device of claim 9, wherein the substrate comprises:

a wall that separates the first ventilation port from the second ventilation port; and a recess in the wall at the first surface of the substrate.

11. The electronic device of claim 10, wherein the recess has an open end, a rear wall opposite the open end, and an edge that extends from the open end to the rear wall, the third conductive trace being disposed on the edge of the recess.

12. The electronic device of claim 10, the substrate further comprising:

an additional wall that forms an edge of the first ventilation port and that forms an edge of the second ventilation port, wherein the first, second, and third conductive traces are disposed on the additional wall and the third conductive trace extends through the recess.

13. The electronic device of claim 12, wherein the additional wall is oriented perpendicular to the wall.

14. The electronic device of claim 10, wherein the antenna comprises:

a positive antenna feed terminal; and a fourth conductive trace on the wall that couples the first conductive trace to the positive antenna feed terminal.

15. An electronic device comprising:

a housing having an upper housing portion that contains a display and having a lower housing portion, wherein the lower housing portion has opposing first and second conductive walls and the lower housing portion is separated from the upper housing portion by at least one slot;

a substrate disposed in the lower housing portion between the first and second conductive walls, wherein the substrate has a first surface that faces an interior of the lower housing portion and a second surface that faces the at least one slot;

first and second ventilation ports in the substrate that extend from the second surface towards the first surface, wherein the first and second ventilation ports are separated by a rib of the substrate at the second surface;

a notch in the substrate, wherein the notch has a closed end defined by a portion of the rib, a second end opposite the first end, and an edge that extends from the closed end to the open end; and an antenna radiating element that is configured to radiate through the at least one slot and that includes a first conductive trace in the first ventilation port, a second conductive trace in the second ventilation port, and a third conductive trace on the edge of the notch, wherein the third conductive trace couples the first conductive trace to the second conductive trace.

16. The electronic device of claim 15, wherein the closed end of the notch is separated from the first surface by a first non-zero distance and is separated from the second surface by a second non-zero distance greater than the first non-zero distance.

17. The electronic device of claim 15, wherein the first, second, and third conductive traces are offset from the second surface of the substrate.

18. The electronic device of claim 17, wherein the second surface of the substrate is free of conductive material from the antenna radiating element.

19. The electronic device of claim 15, wherein the first and second ventilation ports are merged at the first surface of the substrate by the open end of the notch.

20. The electronic device of claim 15, wherein the first conductive wall is parallel to the second conductive wall, the edge of the notch being oriented at a non-parallel and non-perpendicular angle with respect to the first and second conductive walls.

* * * * *